United States Patent
Reddy Sirigiri et al.

(10) Patent No.: US 9,032,240 B2
(45) Date of Patent: May 12, 2015

(54) METHOD AND SYSTEM FOR PROVIDING HIGH AVAILABILITY SCTP APPLICATIONS

(75) Inventors: Anil Kumar Reddy Sirigiri, Bangalore (IN); Chaitra Maraliga Ramaiah, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1392 days.

(21) Appl. No.: 12/428,487

(22) Filed: Apr. 23, 2009

(65) Prior Publication Data

US 2010/0218034 A1 Aug. 26, 2010

(30) Foreign Application Priority Data

Feb. 24, 2009 (IN) .............................. 396/CHE/2009

(51) Int. Cl.
*G06F 11/07* (2006.01)
*G06F 11/20* (2006.01)

(52) U.S. Cl.
CPC ........ *G06F 11/2028* (2013.01); *G06F 11/2038* (2013.01); *G06F 11/2048* (2013.01); *G06F 11/2097* (2013.01)

(58) Field of Classification Search
USPC .................................................. 714/4.11, 12
See application file for complete search history.

(56) References Cited

U.S. PATENT DOCUMENTS

2004/0199662 A1* 10/2004 Karol et al. .................... 709/238
2005/0174989 A1* 8/2005 Chen et al. ..................... 370/351
2006/0133343 A1* 6/2006 Huang .......................... 370/349
2006/0164974 A1* 7/2006 Ramalho et al. .............. 370/219
2009/0063893 A1* 3/2009 Bagepalli et al. ................. 714/4

OTHER PUBLICATIONS

Florin Sultan, et al.; "Migratory TCP: Connection Migration for Service Continuity in the Internet"; IEEE, Proceedings of the 22nd International Conference on Distributed Computing Systems (ICDCS'02); 2002.

Joacim Haggmark; "Design and Implementation of TCP and SCTP Connection Migration Function for an IP High Availability Framework"; Master's Thesis; Lulea University of Technology; 2007: 267 IV-ISSN: 1402-1617—ISRN: LTU-EX—07/267—SE.

Manish Marwah, et al.; "TCP Server Fault Tolerance Using Connection Migration to a Backup Server"; Proc. of IEEE Int. Conf. on Dependable Systems and Networks (DSN 2003), San Francisco, CA, Jun. 22-25, 2003.

(Continued)

*Primary Examiner* — Chae Ko
(74) *Attorney, Agent, or Firm* — Van Cott, Bagley, Cornwall & McCarthy

(57) ABSTRACT

A method and system for providing high availability services to SCTP applications is disclosed. In one embodiment, a high availability (HA) server system includes an active server and a standby server with a primary redundancy module and a secondary redundancy module, respectively, which are operable for performing a method including forming a control channel between the active server and the standby server, forwarding IP addresses of the active server and the standby server to a client device when an association between the client device and the active server is established, synchronously mirroring a state of a SCTP stack and a state of an application of the active server to the standby server using the control channel, and servicing the client device using the standby server based on the state of the SCTP stack and the state of the application if a failure of the active server is detected.

17 Claims, 4 Drawing Sheets

(56) References Cited

OTHER PUBLICATIONS

N. Ayari, et al.; "A Survey on High Availability Mechanisms for IP Services"; France Telecom Research & Development; HAPCW'2005; Oct. 11, 2005; Santa Fe, California, U.S.A.

R. Stewart, et al.; "Stream Control Transmission Protocol (SCTP) Dynamic Address Reconfiguration"; Standards Track; Sep. 2007; http://www.ietf.org/rfc/rfc5061.txt.

R. Stewart, et al.; "Stream Control Transmission Protocol"; The Internet Society; Oct. 2000.

"Signaling Transport (sigtran)", http://datatracker.ietf.org/wg/sigtran/charter/; Apr. 4, 2011.

Joel Sloss, "Clustering Terms and Technologies", SQL Server Magazine, http://www.sqlmag.com/article/clustering/clustering-terms-and-technologies; Apr. 4, 2011.

\* cited by examiner

METHOD AND SYSTEM FOR PROVIDING HIGH AVAILABILITY SCTP APPLICATIONS

BACKGROUND

High availability (HA) is a system design protocol and associated implementation that ensures a certain degree of operational continuity during a given time period. For example, a HA system may comprises an active server which services a client device and a standby server which is designed to take over the active server in case of a failure. Such a HA system may be based on stream control transmission protocol (SCTP) which provides a level of redundancy, like multi-homing such that the IP addresses of both the active and standby servers may be associated with the client device as multiple IP addresses of the active server. Consequently, SCTP provides redundancy when there is a link or a network failure. That is, the client device may be serviced using the standby server if the active server is no longer available due to the failure of the active server.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A method and system for providing HA SCTP applications is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
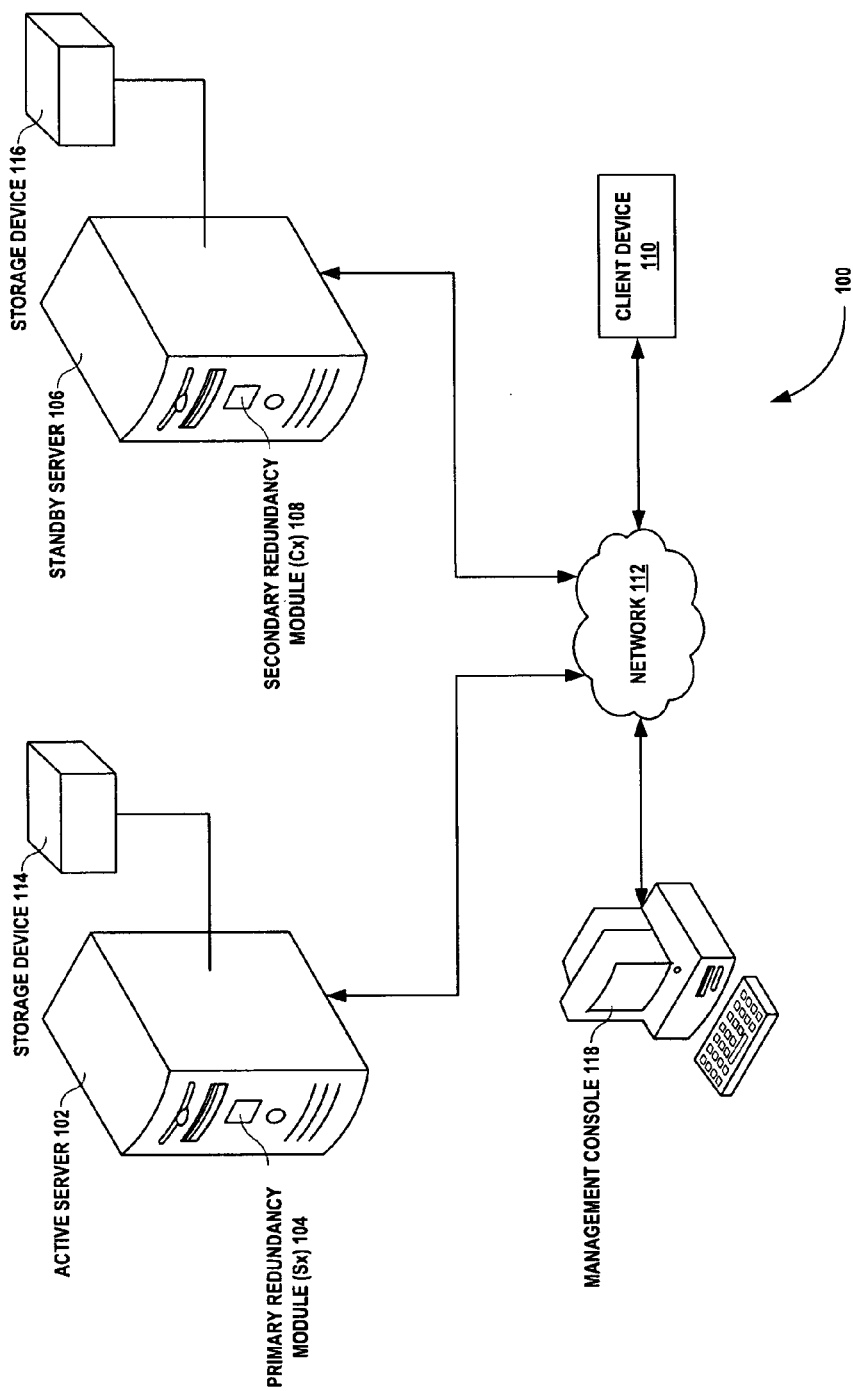
FIG. 1 illustrates an exemplary HA server system, according to one embodiment.

FIG. 1 illustrates an exemplary HA server system 100, according to one embodiment. Particularly, FIG. 1 illustrates the HA server system 100 capable of providing HA services to SCTP applications. As shown in FIG. 1, the HA server system 100 includes an active server 102 having a primary redundancy module (Sx) 104. The HA server system 100 also includes a standby server 106, for example, hot-standby server or cold-standby server, having a secondary redundancy module (Cx) 108. Further as shown in FIG. 1, the active server 102 and the standby server 106 are communicatively coupled to a client device 110 via a network 112, for example, local area network, for servicing the client device 110.

Further, as illustrated in FIG. 1, the active server 102 and the standby server 106 are communicatively coupled to a storage device 114 and a storage device 116, respectively. The storage device 114 and storage device 116 may be used for storing application data associated with the client device 110. The storage device 114 and the storage device 116 may be a part of the active server 102 and the standby server 106, respectively. Furthermore, as shown in FIG. 1, a management console 118 is connected to the active server 102 and the standby server 106 via the network 112 for managing the active server 102 and the standby server 104.

The primary redundancy module (Sx) 104 of the active server 102 and the secondary redundancy module (Cx) 108 of the standby server 106 may enable the HA server system 100 to provide HA services to SCTP applications. In other words, the standby server 106 may take charge of an association between the client device 110 and the active server 102. In addition, the standby server 106 may service the client device 110 based on a state of a SCTP stack and a state of an application of the active server 102 if a failure of the active server 102 is detected.

Figure 2:
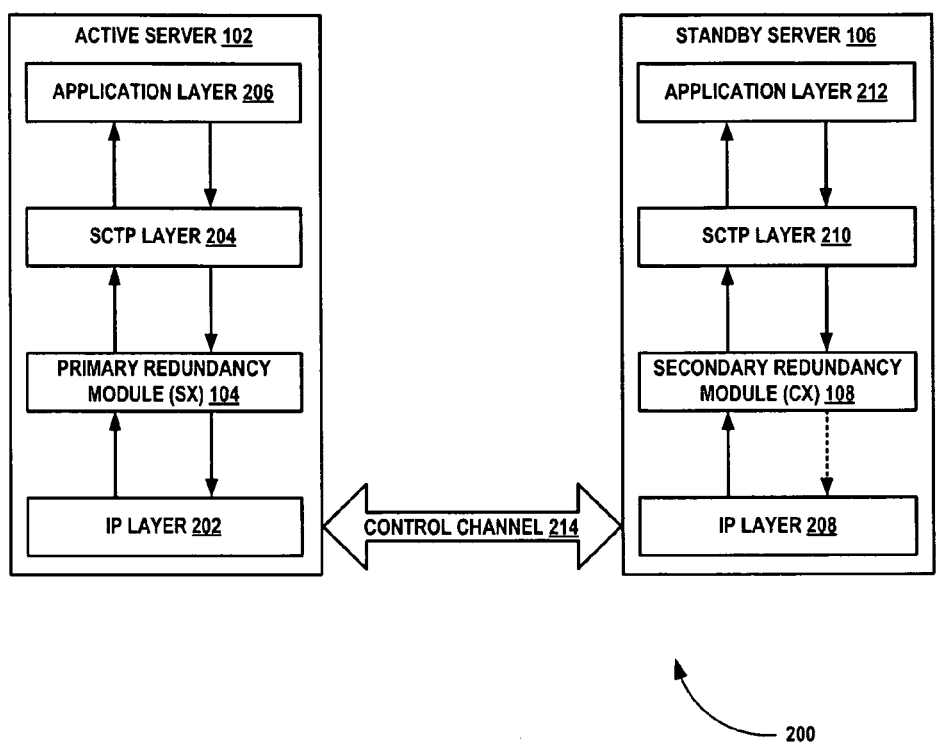
FIG. 2 illustrates an exploded view of the active server and the standby server of the HA server system of FIG. 1, according to one embodiment.

FIG. 2 illustrates an exploded view 200 of the active server 102 and the standby server 106 of the HA server system 100 of FIG. 1, according to one embodiment. As shown in FIG. 2, the active server 102 includes the primary redundancy module (Sx) 104, an internet protocol (IP) layer 202, a SCTP layer 204, and an application layer 206. The primary redundancy module (Sx) 104 is coupled between the IP layer 202 and the SCTP layer 204. Further, the standby server 106 includes the secondary redundancy module (Cx) 108, an IP layer 208, a SCTP layer 210, and an application layer 212. The secondary redundancy module (Cx) 108 is coupled between the IP layer 208 and the SCTP layer 210.

The primary redundancy module (Sx) 104 and the secondary redundancy module (Cx) 108 may be operable for forming a control channel 214 between the active server 102 and the standby server 106. The primary redundancy module (Sx) 104 and the secondary redundancy module (Cx) 108 may then forward an IP address of the active server 102 and an IP address of the standby server 106 to the client device 110 when an association between the client device 110 and the active server 102 is established based on SCTP.

Further, the primary redundancy module (Sx) 104 and the secondary redundancy module (Cx) 108 may be operable for synchronously mirroring a state of a SCTP stack and a state of an application of the active server 102 to the standby server 106 using the control channel 214. Moreover, the primary redundancy module (Sx) 104 and the secondary redundancy module (Cx) 108 may be operable for servicing the client device 110 using the standby server 106 based on the state of the SCTP stack and the state of the application if a failure of the active server 102 is detected. Furthermore, the standby server 106 may take charge of the association if the failure of the active server 102 is detected.

Since, the IP layer 202, the SCTP layer 204 and the application layer 206 of the active server 102 are well known to a person skilled in the art, the explanation hereof is omitted. In a similar manner, the IP layer 208, the SCTP layer 210 and the application layer 212 of the standby server 106 are well known to a person skilled in the art, the explanation hereof is omitted. The process performed by the HA server system 100 using the modules/layers shown in FIG. 2 is explained in greater detail with respect to FIG. 3.

Figure 3:
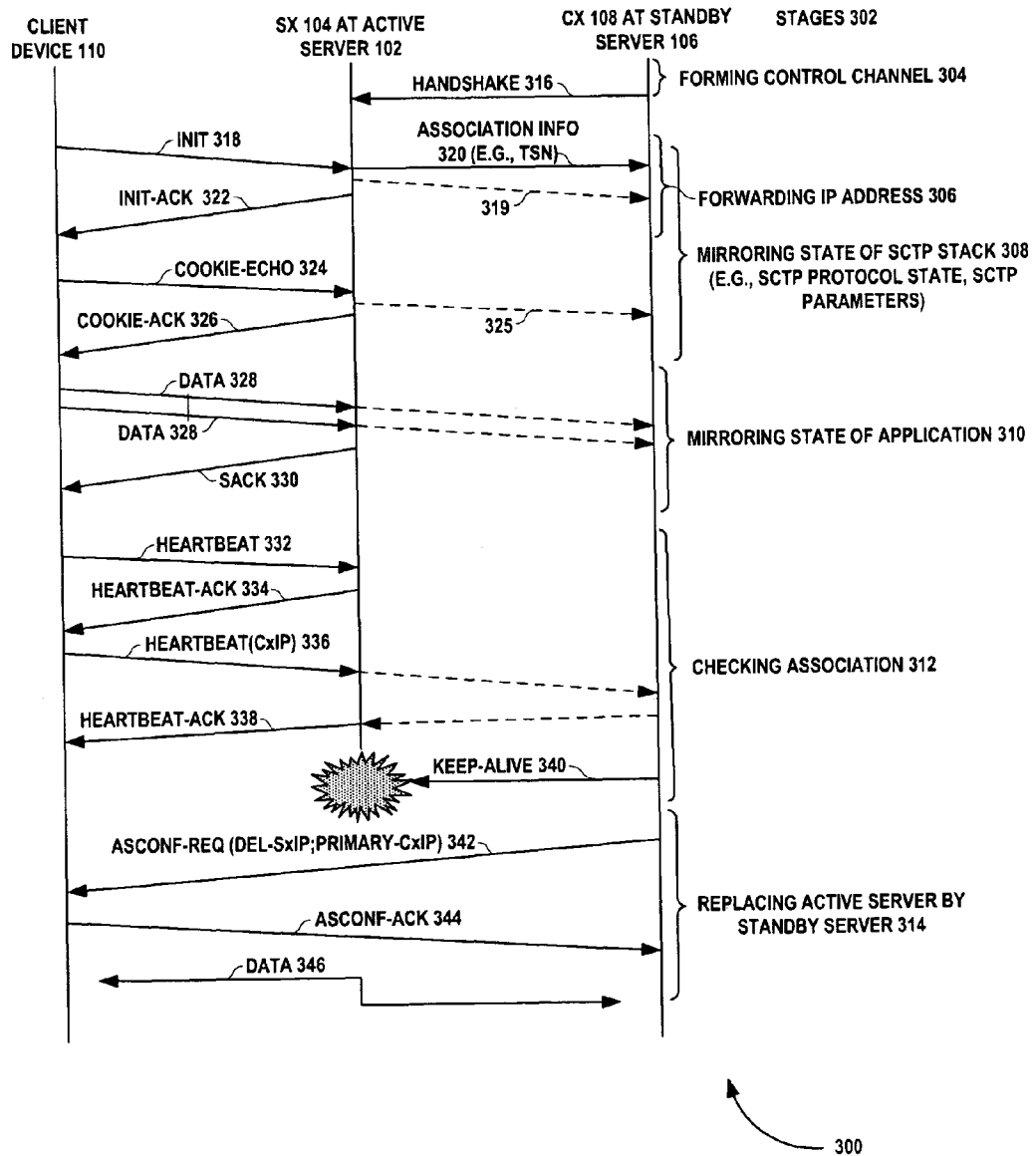
FIG. 3 illustrates an exemplary process performed by the HA server system of FIG. 1, according to one embodiment.

FIG. 3 illustrates an exemplary process 300 performed by the HA server system 100 of FIG. 1, according to one embodiment. As shown in FIG. 3, the process 300 performed by the HA server system 100 involves various stages 302. The various stages 302 includes forming control channel 304, forwarding IP addresses 306, mirroring state of SCTP stack 308, mirroring state of application 310, checking association 312 and replacing active server by standby server 314.

At 304, a handshake 316 between the active server 102 and the standby server 106 is performed. When the handshake 316 between the active server 102 and the standby server 106 is performed, the control channel 214 is formed between the active server 102 and the standby server 106. In one embodiment, the primary redundancy module (Sx) 104 at the active server 102 and the secondary redundancy module (Cx) 108 at the standby server 106 exchange an IP address of the active server 102 and an IP address of the standby server 106 with each other during the handshake 316. This may help the active server 102 to learn the IP address of the standby server 106. In one exemplary implementation, the IP address of the standby server 106 may be exchanged by passing information through an input/output control (IOCTL) call or by editing a configuration file which is read by the primary redundancy module (Sx) 104 at the active server 102. The handshake 316 may be performed when both the active server 102 and the standby server 106 are up.

At 306, a connection with the active server 102 is initiated by the client device 110 by forwarding init 318 packet, for example, a SCTP message, to the active server 102. The init 318 may include information such as an IP address of the client device 110. Thus, an association between the client device 110 and the active server 102 is established based on SCTP. Further, upon receiving the init 318, association information 320, for example, transitional security network is exchanged by the primary redundancy module (Sx) 104 at the active server 102 with the secondary redundancy module (Cx) 108 at the standby server 106 via the control channel 214.

Also, an init-ack 322 packet, which may include the IP address of the active server 102 and the IP address of the standby server 106, is forwarded to the client device 110. The forwarding may be performed by the primary redundancy module (Sx) 104 at the active server 102 when the association between the client device 110 and the active server 102 is established based on the SCTP. In one embodiment, the IP address of the standby server 106 may be presented to the client device 110 as a secondary IP address of the active server 102.

At 308, a state of a SCTP stack is synchronously mirrored to the standby server 106 using the control channel 214, as indicated by dotted arrow lines 319 and 325. For example, the state of the SCTP stack may include a SCTP protocol state and SCTP parameters. In one embodiment, the SCTP parameters for the association may be duplicated to the standby server 106 via the control channel 214. In one exemplary implementation, the secondary redundancy module (Cx) 108 at the standby server 106 may hand over the SCTP parameters to the SCTP layer 210. The SCTP layer 210 may then get updated with the SCTP protocol statistics and SCTP protocol state for the association. In this manner, the SCTP parameters and the SCTP protocol state may be kept in synchronization on the standby server 106 with that of the active server 102.

Further, a cookie-echo 324 is received by the primary redundancy module (Sx) 104 at the active server 102 from the client device 110. The cookie-echo 324 is duplicated by the primary redundancy module (Sx) 104 to the standby server 106 upon receiving the cookie-echo 324. Also, upon receiving the cookie-echo 324, a cookie-ack 326 is sent back by the primary redundancy module (Sx) 104 at the active server 102 to the client device 110. It should be noted that, the connection initiation is complete once the cookie-ack 326 is sent to the client device 110.

At 310, data 328 is received by the active server 102 from the client device 110. In one embodiment, the data 328 is then processed by an application of the active server 102. Further, a state of the application of the active server 102 is synchronously mirrored by the primary redundancy module (Sx) 104 at the active server 102 to the standby server 106 using the control channel 214. In one embodiment, the state of the application of the active server 102 is synchronously mirrored by forwarding the data 328 processed by the application of the active server 102 to the standby server 106 and running a respective application on the standby server 106 using the data 328.

In one exemplary implementation, the application layer 212 on the standby server 106 may forward data processed by the respective application to the SCTP layer 210. The SCTP layer 210 may perform SCTP protocol processing on the data and forwards it to the secondary redundancy module (Cx) 108 at the standby server 106. The secondary redundancy module (Cx) 108 at the standby server 106 may have an intelligence built in that the standby server 106 runs as a client instance and thus drops the data packet. In other words, a pseudo-simulation of data transfer is emulated at the standby server 106. In this manner, the state of the application is kept synchronously mirrored on the standby server 106. One skilled in the art may envision that other application migration techniques may be employed for the application migration. Also, these application migration techniques may be coupled with the above-described association migration technique to provide a complete migration solution. Further, the receipt of the data 328 is acknowledged using a sack signal 330 forwarded by the active server 102 to the client device 110.

At 312, a state of the association is periodically checked using a heartbeat signal 332 forwarded by the client device 110 to the IP address of the active server 102. The primary redundancy module (Sx) 104 at the active server 102 then sends back a heartbeat-ack signal 334 to the client device 110 upon receiving the heartbeat signal 332. Similarly, another state of the association is periodically checked using a heartbeat signal 336 forwarded by the client device 110 to the secondary IP address, for example, via the primary redundancy module (Sx) 104. In one embodiment, the secondary redundancy module (Cx) 108 at the standby server 106 may redirect a heartbeat-ack signal 338 to the primary redundancy module (Sx) 104 at the active server 102 which then forwards the heartbeat-ack signal 338 to the client device 110, as shown in FIG. 3. In an alternate embodiment, the secondary redundancy module (Cx) 108 at the standby server 106 may send back a heartbeat-ack signal 338 directly to the client device 110 upon receiving the heartbeat signal 336.

Also, at 312, a keep-alive signal 340 is periodically exchanged between the active server 102 and the standby server 106 to detect a failure of the active server 102. In case if the active server 102 fails, for example, the active server 102 goes down or its link fails, the secondary redundancy module (Cx) 108 at the standby server 106 may detect the failure of the active server 102 either through a control signal or loss of an acknowledgement signal of the keep-alive signal 340. In the example embodiment illustrated in FIG. 3, as the acknowledgement signal is lost, the failure of the active server 102 may be detected.

At 314, the standby server 106 takes charge of the association when the failure of the active server 102 is detected. The standby server 106 takes charge of the association using an asconf-req signal 342 forwarded by the standby server 106 to the client device 110. For example, the asconf-req signal 342 may be used to inform the client device 110 to delete the IP address of the active server 102 and communicate using the secondary IP address. The client device 110 then acknowledges the receipt of the asconf-req signal 342 by sending an asconf-ack signal 344 to the standby server 106. Since, at the SCTP protocol level, the IP address of the active server 102 is unreachable, the client device 110 communicates using the secondary IP address as a primary IP address for the association. It should noted that, when the failure of the active server 102 is detected and when the standby server 106 takes charge of the association, the secondary redundancy module (Cx) 108 marks itself as a primary redundancy module (Sx).

Also, as the standby server 106 is synchronously mirrored with the state of the SCTP stack and the state of the application of the active server 102, the association is maintained between the client device 110 and the secondary IP address, for example, the IP address of the standby server 106. This ensures seamless migration of the association from the active server 102 to the standby server 106 if the failure of the active server 102 is detected. Further, the client device 110 is serviced using the standby server 106 based on the state of the SCTP stack and the state of the application of the active server 102, as indicated by data 346.

It is appreciated that if the active server 102 comes up again, the primary redundancy module (Sx) may send a control signal, thereby signaling its availability. Then, the standby server 106 may perform a handshake with the active server 102, and the active server 102 may act as a standby node till the failure of the standby sever 106 is detected. It is also appreciated that, if during the switchover, there are some packet drops or there are some out-of-window packets, the SCTP protocol may take care of these conditions by mechanism like retransmission and selective acknowledgement.

Figure 4:
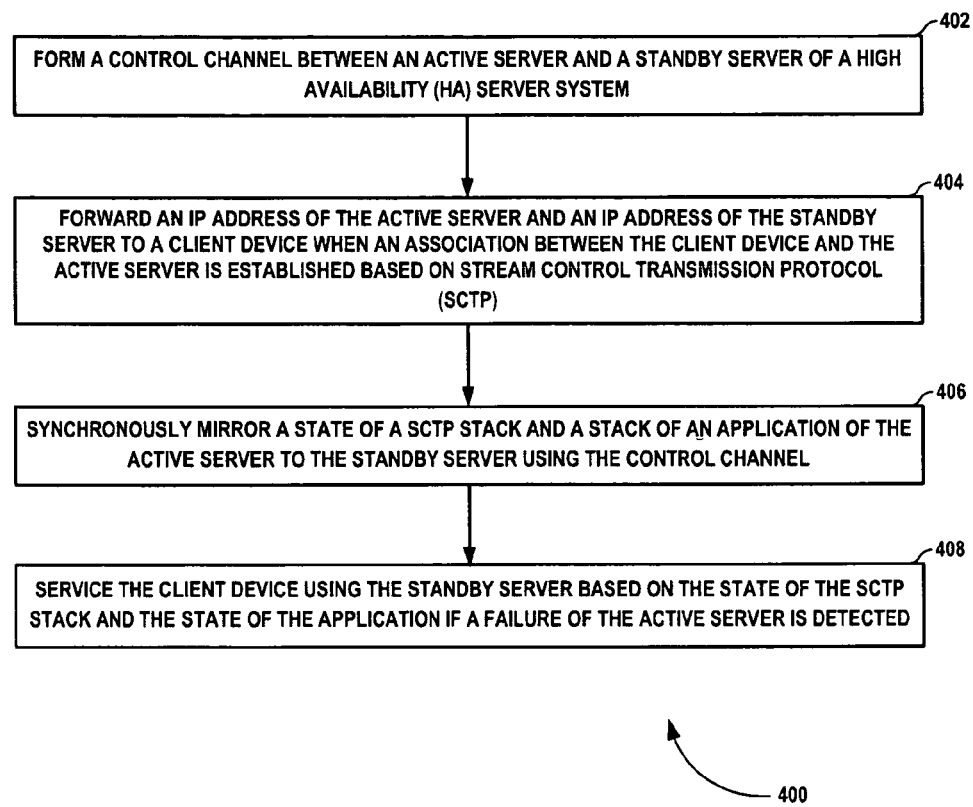
FIG. 4 illustrates a process flow chart of an exemplary method for a HA server system, according to one embodiment.

FIG. 4 illustrates a process flow chart 400 of an exemplary method for a HA server system, according to one embodiment. In step 402, a control channel is formed between an active server and a standby server of the HA server system. In one embodiment, the control channel may be formed when a handshake between the active server and the standby server is performed. In step 404, an IP address of the active server and an IP address of the standby server are forwarded to a client device when an association between the client device and the active server is established based on SCTP. In one exemplary implementation, the IP address of the standby server may be presented to the client device as a secondary IP address of the active server. In one embodiment, a state of the association may be checked using a heartbeat signal forwarded by the client device to the IP address of the active server and the secondary IP address.

In step 406, a state of a SCTP stack, for example, which may include a SCTP protocol state and SCTP parameters, and a state of an application of the active server are synchronously mirrored to the standby server using the control channel. In one embodiment, the state of the SCTP stack may be synchronously mirrored by duplicating the SCTP parameters for the association to the standby server via the control channel. In another embodiment, the state of the application of the active server may be synchronously mirrored to the standby server by forwarding data processed by the application of the active server to the standby server and running a respective application of the standby server using the data.

In step 408, the client device is serviced using the standby server based on the state of the SCTP stack and the state of the application if a failure of the active server is detected. In one exemplary implementation, the failure of the active server may be detected by periodically exchanging a keep-alive signal between the active server and the standby server. It is appreciated that, the association is maintained between the client device and the secondary IP address in case of the failure of the active server is detected. It is also appreciated that, the standby server takes charge of the association if the failure of the active server is detected. Moreover, in one example embodiment, a computer readable medium for a HA server system has instructions that, when executed by a computer, cause the computer to perform the method of FIG. 4.

In various embodiments, the HA server systems and methods described in FIGS. 1 through 4 may provide a high availability feature by virtue of which the association is maintained between the client device and the IP address of the standby server. In addition, the client device may be serviced by the standby application running on the standby server when a failure of the active server is detected. In the embodiments, the migration of the association may be employed by exploiting the multi-homing facility of SCTP protocol. Additionally, the migration of application and association may be done transparently without modifying the SCTP protocol. Also, in the embodiments, for migrating the association, there may be no need for the client device to open a new association/connection to the standby server(s) which is automatically taken care of by the primary redundancy module (Sx) and the secondary redundancy module (Cx) residing in the active server and the standby server, respectively.

In the various embodiments, the primary redundancy module (Sx) and the secondary redundancy module (Cx) may work very closely with the SCTP software such that these modules may be thought of as an extension of the SCTP software. However, it should be noted that, the SCTP software may run in isolation without these modules. Moreover, the communication between the primary redundancy module (Sx) and the secondary redundancy module (Cx) may be protected using standard security mechanisms so that addition of IP address(es) of one or more server's into an association may be secured. Any dynamic IP address configuration on either the active server or the standby server may be used on an existing SCTP association, by using add IP (ADDIP) functionality that is available with the protocol. The same ADDIP method may be used to extend number of nodes in 'active-standby' cluster. The above described HA server system may not depend on gratuitous address resolution protocol for the service to be reachable.

In addition, the various operations, processes, and methods disclosed herein may be embodied in a machine-readable medium and/or a machine accessible medium compatible with a data processing system, for example, a computer system, and may be performed in any order, which may include using means for achieving the various operations. Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. More particularly, although the methods and systems in FIGS. 1 through 4 are illustrated in context of active-standby server configuration, one may envision that the HA server system is capable of providing HA services to the SCTP applications using other server configurations such as active-active. Moreover, even though the HA server system is explained with respect to two servers, one skilled in the art may envision a HA server system based on multiple servers, like in a cluster configuration. Furthermore, the various devices, modules, analyzers, generators, etc. described herein may be enabled and operated using hardware circuitry, for example, CMOS based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuitry.

What is claimed is:

1. A method for a high availability (HA) server system, comprising:
   forwarding an IP address of an active server, and an IP address of a standby server of the HA server system, to a client device when an association between the client device and the active server is established based on stream control transmission protocol (SCTP);
   synchronously mirroring a state of a SCTP stack and a state of an application of the active server to the standby server using a control channel between the active server and the standby server; and,
   when a failure of the active server is detected, servicing the client device using the standby server based on the state of the SCTP stack and the state of the application;
   wherein the IP address of the standby server is presented to the client device as a secondary IP address of the active server.

2. The method of claim 1, wherein the forming the control channel is performed when a handshake between the active server and the standby server is performed.

3. The method of claim 1, wherein a state of the association is checked using a heartbeat signal forwarded by the client device to the IP address of the active server and to the secondary IP address of the active server.

4. The method of claim 3, wherein the association is maintained between the client device and the secondary IP address in case of the failure of the active server.

5. The method of claim 1, wherein the state of the SCTP stack comprises a SCTP state and SCTP parameters.

6. The method of claim 5, wherein the synchronously mirroring the state of the SCTP stack comprises duplicating the SCTP parameters for the association to the standby server via the control channel.

7. The method of claim 1, wherein the synchronously mirroring the state of the application of the active server to the standby server comprises:
   forwarding data processed by the application of the active server to the standby server; and
   running a respective application of the standby server using the data.

8. The method of claim 1, wherein the failure of the active server is detected by periodically exchanging a keep-alive signal between the active server and the standby server.

9. The method of claim 1, wherein the standby server takes charge of the association if the failure of the active server is detected.

10. The method of claim 1, further comprising:
    receiving a cookie-echo from the client device with the active server; and
    duplicating the cookie-echo to the standby server from the active server.

11. The method of claim 3, further comprising:
    receiving a heartbeat signal from the client device with the standby server;
    directing a corresponding heartbeat acknowledge signal from the standby server to the active server; and
    forwarding the heartbeat acknowledge signal from the active server to the client device.

12. The method of claim 1, further comprising, upon failure of the active server, signaling the client device with the backup server to delete the IP address of the active server and communicating using the IP address of the standby server.

13. A high availability (HA) server system, comprising:
    an active server with a primary redundancy module; and
    a standby server with a secondary redundancy module, wherein the primary redundancy module and the secondary redundancy module are operable for performing a method, comprising:
    forming a control channel between the active server and the standby server;
    forwarding an IP address of the active server and an IP address of the standby server to a client device when an association between the client device and the active server is established based on stream control transmission protocol (SCTP), wherein the active server presents the IP address of the standby server to the client device as a secondary IP address of the active server;
    synchronously mirroring a state of a SCTP stack and a state of an application of the active server to the standby server using the control channel; and
    servicing the client device using the standby server based on the state of the SCTP stack and the state of the application if a failure of the active server is detected.

14. The system of claim 13, wherein the primary redundancy module is coupled between an internet protocol (IP) layer of the active server and a SCTP layer of the active server, and wherein the secondary redundancy module is coupled between an IP layer of the standby server and a SCTP layer of the standby server.

15. The system of claim 13, wherein each of the active server and the standby sever further comprises an application layer.

16. The system of claim 13, wherein the standby server takes charge of the association if the failure of the active server is detected.

17. A non-transitory computer readable medium for a high availability (HA) server system having instructions that, when executed by a computer, cause the computer to perform a method comprising:
    forming a control channel between an active server and a standby server of the HA server system;
    forwarding an IP address of the active server and an IP address of the standby server to a client device when an association between the client device and the active server is established based on stream control transmission protocol (SCTP), wherein the IP address of the standby server is presented to the client device as a secondary IP address of the active server;
    synchronously mirroring a state of a SCTP stack and a state of an application of the active server to the standby server using the control channel; and
    servicing the client device using the standby server based on the state of the SCTP stack and the state of the application if a failure of the active server is detected.

* * * * *